C. W. ABBOTT.
METAL CONDUIT FOR ELECTRIC WIRES.
APPLICATION FILED AUG. 18, 1915.
1,209,533.
Patented Dec. 19, 1916.
4 SHEETS—SHEET 1.
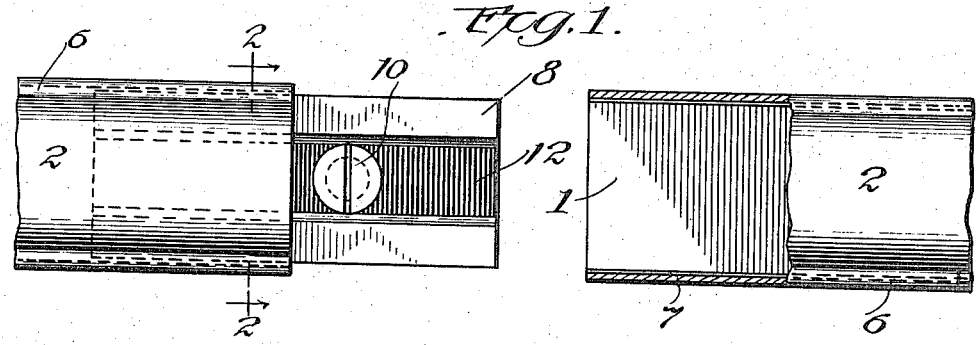
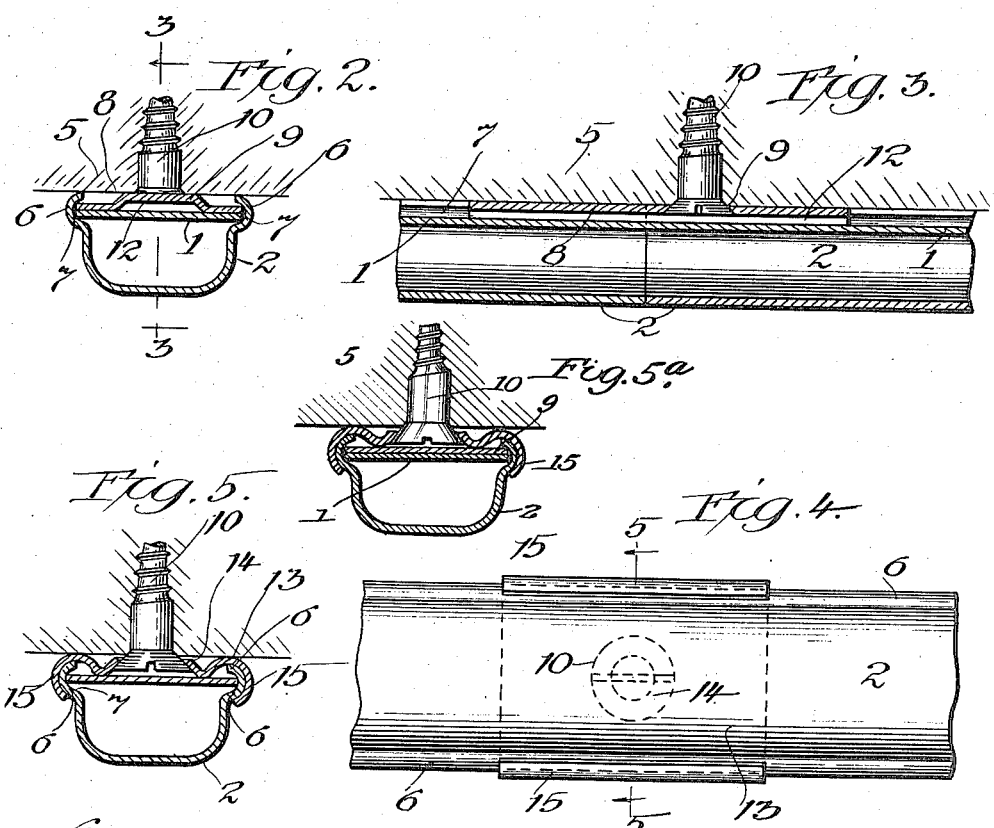
Witness:
Harry S. Gaither
H. A. Neiburger
Inventor,
Chauncey W. Abbott
By William J. Bradbury
Attys C. W. ABBOTT.
METAL CONDUIT FOR ELECTRIC WIRES.
APPLICATION FILED AUG. 18, 1915.
1,209,533.
Patented Dec. 19, 1916.
4 SHEETS—SHEET 2.
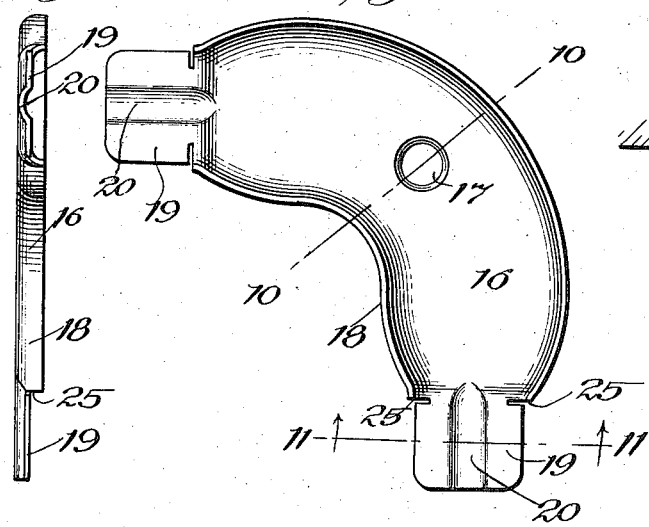
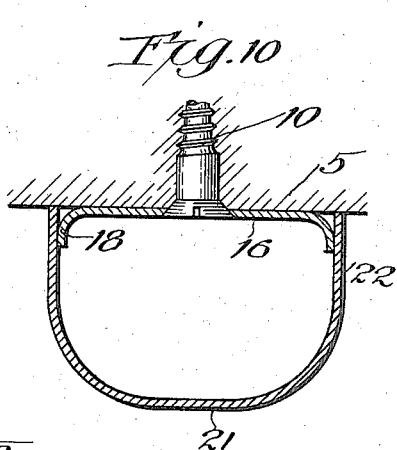
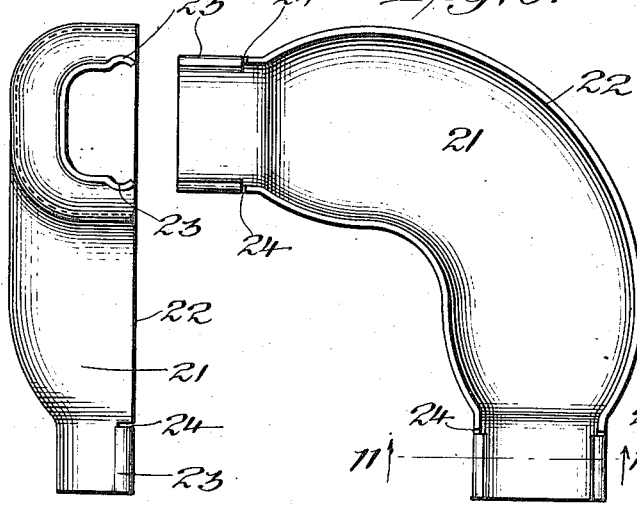
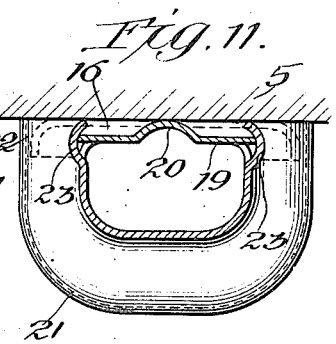
Witness:
Harry S. Gaither
H. A. Neiburger
Inventor.
Chauncey W. Abbott
by William Bradbury
Attys

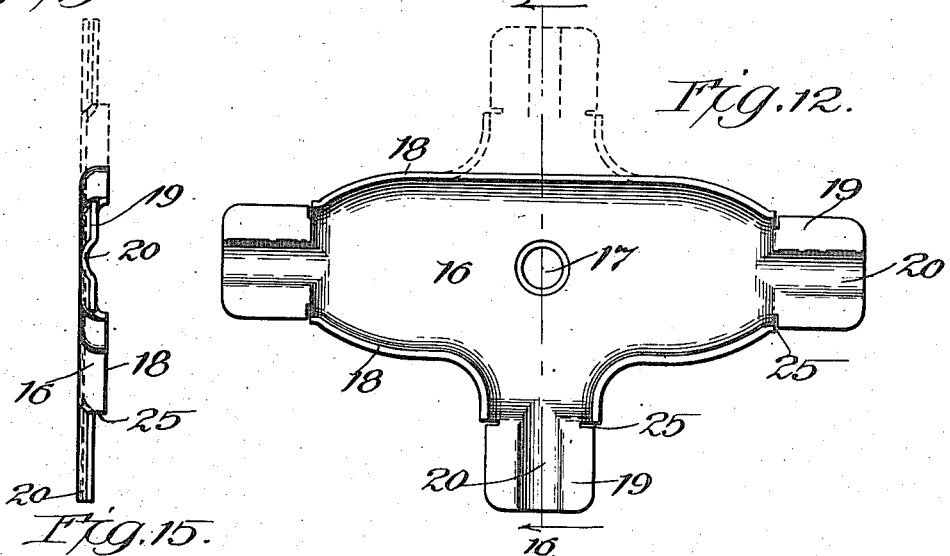

C. W. ABBOTT.
METAL CONDUIT FOR ELECTRIC WIRES.
APPLICATION FILED AUG. 18, 1915.
1,209,533.
Patented Dec. 19, 1916.
4 SHEETS—SHEET 4.
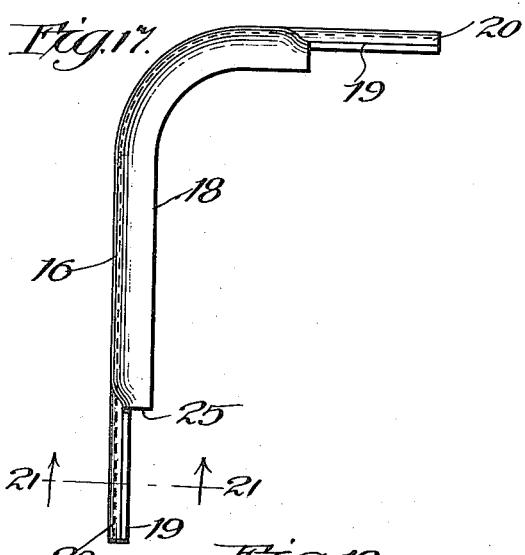
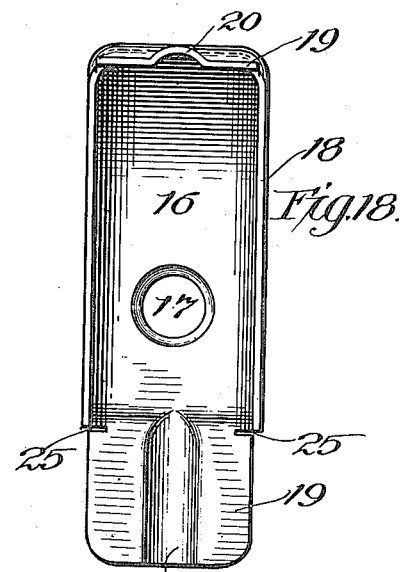
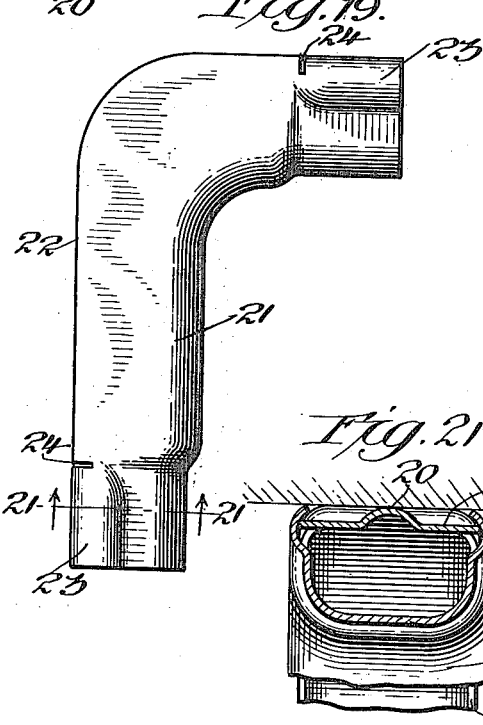
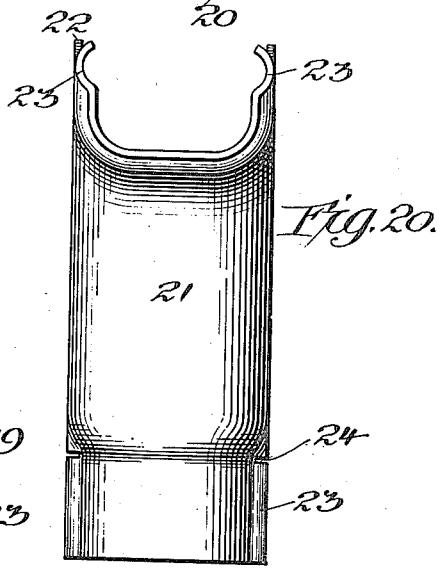
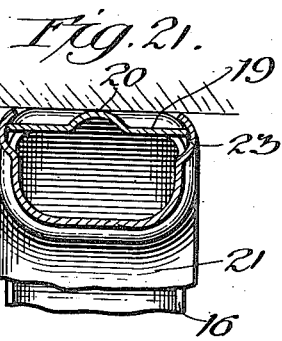
Witness:
Harry S. Gaither
H. A. Neiburger
Inventor:
Chauncey W. Abbott
by Williams & Bradbury
Attys

UNITED STATES PATENT OFFICE.

CHAUNCEY W. ABBOTT, OF PITTSBURGH, PENNSYLVANIA, ASSIGNOR TO AMERICAN CONDUIT MANUFACTURING COMPANY, OF PITTSBURGH, PENNSYLVANIA, A CORPORATION OF PENNSYLVANIA.

METAL CONDUIT FOR ELECTRIC WIRES.

1,209,533.   Specification of Letters Patent.   Patented Dec. 19, 1916.

Application filed August 18, 1915. Serial No. 46,064.

*To all whom it may concern:*

Be it known that I, CHAUNCEY W. ABBOTT, a citizen of the United States, residing at Pittsburgh, in the county of Allegheny and State of Pennsylvania, have invented certain new and useful Improvements in Metal Conduits for Electric Wires, of which the following is a full, clear, concise, and exact description, reference being had to the accompanying drawings, forming a part of this specification.

This invention relates to metal conduits for electric wires, and particularly to conduits for application to a wall, ceiling or other exposed supporting surface, such as are used for installing electric wiring systems after erection of the building or for extending existing systems, or for other like uses.

The object of the invention is to provide a conduit of this kind which is of simple and inexpensive construction, which has a neat and graceful appearance when applied to the wall, which can be easily and readily assembled, which can be fitted and applied to the supporting surface with no other trimming than merely cutting the pieces to proper length, which provides a smooth, uninterrupted and unblocked wire channel, and which also provides perfect electrical continuity of the conduit so that it may be used as the return or ground conductor of the electrical system.

In carrying out the foregoing objects I have endeavored to and have produced a conduit which when attached to a flat supporting surface seals the space between the supporting surface and the conduit itself by means of a pair of sharp, almost knife-like, edges which press against and slightly into the supporting surface and prevent the collection of either dust or moisture in the space between the conduit and the supporting wall or ceiling. The prime object of metal conduits is to confine breakdowns of the electric system to quarters in which they cannot communicate fire to the building in which the breakdowns occur. Even with great precaution the conduit occasionally becomes heated from some wiring breakdown within, which is responsible for the precaution against dust collection as provided in my improved conduit.

The herein-described embodiment of my invention provides a continuous unbroken interior passage and a similar external visible surface, the supporting means being hidden from view and at the same time being removed from the passage.

In the accompanying drawings, Figure 1 represents a plan view of the ends of two adjacent conduit sections and a coupling therefor, the sections being separated and one being broken out to show the base member. Fig. 2 is a cross section on the line 2—2 of Fig. 1. Fig. 3 is a longitudinal section on the line 3—3 of Fig. 2 and showing the sections assembled. Fig. 4 is a plan view of a conduit provided with a modified support. Fig. 5 is a cross section on the line 5—5 of Fig. 4. Fig. 5ª is a view illustrating the form and disposition of the coupling which may be employed when clips of the type shown in Fig. 5 are used. Figs. 6 and 7 are respectively plan and end views of the cover of an elbow. Figs. 8 and 9 are respectively plan and end views of the base member of an elbow. Fig. 10 is a cross section on the line 10—10 of Fig. 8. Fig. 11 is a cross section on the line 11—11 of Figs. 6 and 8, and showing the elbow assembled. Figs. 12 and 13 are respectively plan and end views which in full lines indicate the base member of a T and in dotted lines the extension for a cross. Figs. 14 and 15 are respectively plan and end views, indicating in full lines the cap or cover for the T and in dotted lines the extension for a cross. Fig. 16 illustrates a cross section on the line 16—16, of Figs. 12 and 14, and shows the cap and base of the T assembled. Figs. 17 and 18 are respectively side and front views of the base of an internal elbow. Figs. 19 and 20 are respectively side and front views of the cap of an internal elbow; and Fig. 21 is a section on the line 21—21 of Figs. 17 and 19, and showing the base and cap of the internal elbow assembled.

The conduit comprises two main elements, a base 1 and a cap or cover 2. The base is a flat metal strip which is preferably imperforate. The base strip 1 is made of any suitable metal, such as galvanized steel, and is of uniform width from end to end with well defined edges so as to produce good electrical contact with the cover member. The cover member 2 is also made of suitable metal, such as thin sheet steel of such weight and thickness as to be fairly rigid and strong, thus avoiding the accidental production of bends or twists in handling the material which might produce a permanent distortion or set thereof. In cross section the cap or cover is in general, of U-shape, each edge of the material being bent or pressed to form inwardly extending projections 6 which lie between the base and the supporting surface 5 when the conduit is attached thereto, and which projections are preferably in the form of a continuous flange or edge of the material, as shown in Fig. 2, but may be separate projections or tongues bent inwardly and spaced at intervals along the cover, as more fully shown in Figs. 5 to 7 of my prior application for electrical conduit, Serial No. 22,175, filed April 17, 1915. As shown in the drawings, the projections 6 on the two sides of the cover form edges of inwardly facing grooves, channels or seats 7, which are substantially semicylindrical, in cross section and whose inner diameter is somewhat greater, preferably a little more than twice as great as the thickness of the metal of the base 1.

The cap and cover are preferably assembled at the factory in lengths convenient for handling and shipped in that condition to the place of use, the wires being fished or threaded through the conduit after its erection. Consequently the cover is made of such size that the distance across its side walls between the bottoms of the grooves 7 is slightly less than the width of the base, and the metal of the cap is a little too heavy to enable its edges or projections to be sprung laterally over the entire length of the base, although in some cases, as when the projections on the cover are spaced at intervals therealong, as in my prior application referred to, it may be assembled in this way. When the projections are in the form of a continuous flange, as in Fig. 2, the base is drawn endwise into the grooves of the cover and is held there by friction and the pressure of the resilient side walls of the cover, which also produce good electrical contact at the fairly sharp edges of the base.

For securing adjacent or successive conduit sections to each other a special coupling or bond is employed, which may be a part of one of the conduit sections, such as a fitting at a turn or angle in said conduit, as more fully hereinafter described, or may be a separate member inserted between two conduit sections. This coupling may take several forms. It usually consists of a short metal strip 8, of the same width as the base 1 and provided with one or more countersunk holes 9 between the edges for receiving a screw or nail 10 for securing it to the supporting surface 5. Preferably the material of the coupling at or surrounding the hole 9 is depressed between the edges of the coupling, so that when the latter is secured to the wall in the proper position to receive the conduit sections, the head of the nail or screw 10 is sunk in the depressed portion of the coupling, and the laterally projecting edge portions of the coupling are substantially parallel to and spaced from the supporting surface by a distance slightly greater than the thickness of the material of which the cover 2 is made. In its preferred form the coupling member is channeled longitudinally from end to end, as shown at 12, Figs. 1 to 3 inclusive, not only for the purpose of strengthening or reinforcing it, but also to form a depression to receive any projecting portion of the screw head and also to enable the coupling to be seated firmly against the supporting surface with its laterally projecting edge portions substantially parallel thereto and spaced therefrom. This form of coupling member serves another purpose and has another advantage in that when the offset lies adjacent the supporting surface the coupling cannot lie in the conduit above the flat base member thereof, as its channeled portion necessitates locating it between the flat base and the supporting surface if the offset 9 is to lie nearest the supporting surface as intended. Consequently there is little liability of the workman assembling the conduit with the coupling member in the wrong position inside the base member, and so forming obstructions or sharp shoulders in the conduit to hinder the insertion or threading of wires therethrough or which might injure the insulation of the wires. The overlapping of the coupling and end portions of the base members of the two adjacent conduit sections is desirable because it secures a firm wedging of the coupling and base member in the end portions of the caps of the adjacent conduit sections and therefore secures very good electrical conductivity or continuity at the joints in the conduit. The coupling is entirely concealed by the cap or cover which rests solidly against the supporting surface, so that there are no unsightly projections and the entire conduit has a neat and graceful appearance.

If desired, and in cases where the external appearance and dust proof features are of no consequence, such as in attaching to joists or rough ceilings or walls, the conduit may be secured to the supports by special clips, one of which is shown in Figs. 4 and 5, and which consists of a narrow metal strip 13 having a countersunk opening 14 for receiving a screw 10 or nail, and whose ends are bent to form channeled or grooved portions 15 to receive the external faces of the channeled portions 6 of the cover. These clips preferably have sufficient flexibility to enable the conduit section to be sprung into place therein after securing the clip to the wall, thereby enabling the conduit to be readily applied to or removed from the wall for repairs or the like. When these clips are used coupling plates are preferably also used between adjacent conduit sections as illustrated in Fig. 5ª but these need have no screw-holes and may merely serve as reinforcements and electrical bonds at the joints, though securing devices may be passed through the couplings into the support if desired.

For making a joint at an angle but in the same plane the elbow shown in Figs. 6 to 11 is employed, the base 16 thereof being a substantially flat member provided with a countersunk screw-hole 17 for securing it to the wall and having its curved edges turned up slightly to form an annular rim or flange 18. These flanges terminate at the roots of tongues or extensions 19, which form the coupling devices to connect the fitting to the adjacent conduit section to be connected thereto and which, therefore, correspond in function to the couplings 8, and also correspond in structure therewith except that they are an integral portion of the fitting. The tongues or extensions 19 may be flat, but preferably are strengthened or reinforced by a longitudinal channel or groove 20, which also prevents the workman from inserting said extensions into the conduit above the flat base member thereof, and thereby forming obstructions in the conduit to hinder the insertion or threading of wires therethrough or which might injure the insulation of the wires. The extensions 19 are the same width as the base 1 and slip into the grooves 7 of the conduit section under the base, in the same manner as the couplings 8 at the ends of abutting sections. Each elbow has a cover 21 of general U-shape in cross section and whose curved side walls 22 fit over the flanges 18 of the base. The extensions 23 at the ends of the covers are the same shape in cross section as the cap or cover of the conduit sections, but sufficiently larger to be slipped over the ends of said sections and cover them. The side walls of the covers 21 are also slotted or kerfed at the roots of the extensions 23, as at 24, so that the grooved extensions 23 are resilient enough to enable the covers to be applied by snapping them over the conduit ends, as will be readily understood. The shoulders 25 at the ends of the flanges 18 of the base form stops against which the ends of the caps of the adjacent conduit sections abut.

For T's or crosses the fittings shown in Figs. 12 to 16 are employed, said fittings being constructed and applied in the same way as the elbows, but of course having the larger number of lateral extensions 19 and 23 of the base and cap respectively.

Figs. 17 to 21 inclusive illustrate the invention applied to a so-called internal elbow, for use where the conduit is to run up a wall and then turned out horizontally along the ceiling. These fittings are constructed and applied in the same way and are likewise provided with extensions 19 and 23 of the case and cap respectively, forming couplings for connecting them to adjacent conduit sections.

Many other connections may easily be made by providing the necessary special covers and bases for the angles and turns. For straight work it is only necessary to cut the conduit sections to the required length and connect them to the couplings or bonds.

The conduit described is very simple and can be made at low cost, and when applied to the wall is neat, sightly and of graceful appearance. The fittings for angles and turns are curved members of graceful appearance whose covers can be readily removed at any time to inspect the wires. All the connections between adjacent conduit sections, or between a section and a fitting are concealed by the cover so that there are no objectionable or unsightly projections. The form of coupling also provides perfect electrical continuity at all joints, so that the conduit may be used as the return wire of the electrical system, if desired.

Attention is directed to the fact that, due to the form of coupling employed, the base members alone may be made to serve as the return side of the circuit, *i. e.*, the electrical continuity of the base members is in no way dependent upon the cover members. This becomes a feature of considerable importance whenever cover members constructed of non-conductive material are used and in cases where the cover members are coated with enamel and are thus to a greater or less extent incapable of serving as good conductors.

Having thus described my invention, what I claim as new and desire to secure by Letters Patent of the United States is:

1. In an electrical conduit, the combination of a substantially flat base, a cover member of general U or channel shape whose edges embrace the edges of the base, and a separate integral coupling member having laterally projecting edge portions substantially parallel to and spaced from the supporting surface and lying within the edges of adjacent cover members.

2. In an electrical conduit, the combination of a base consisting of a plurality of sections disposed end to end and having laterally projecting edge portions lying parallel to the supporting surface, a separate straight coupling member lying upon the ends of contiguous base sections, and a cap or cover of general U or channel shape having at its edges inwardly extending projections arranged to engage back of the edges of the base and coupling.

3. A conduit for electric conductors comprising a plurality of sections disposed end to end and each section consisting of a substantially flat base member, a U shaped cover member having inwardly cupped seats along the edges thereof for engagement with the lateral edges of the base member, and a coupling member for adjacent conduit sections lying upon the external surfaces of the base members, said coupling member lying wholly within the channel defined by the U shaped cover member and having its lateral edges engaged within the seats of the said cover members.

4. A conduit for electric conductors comprising a flat base, a channel cover having parallel edges overlapping the lateral edges of said base and means to secure said conduit to a flat supporting surface so that the overlapping edges of the cover engage the supporting surface throughout the length of the conduit.

5. In a conduit for electric conductors the combination of a base member extending over a supporting surface and consisting of a plurality of substantially flat sections disposed end to end, a channel cover overlapping the lateral edges of the base and a coupling member lying against the ends of contiguous base sections, said coupling member lying between the base and the supporting surface and having parallel lateral edges and an offset central portion for spacing the lateral edges thereof from the supporting surface.

6. In a conduit for electric conductors the combination of a base extending over a supporting surface and consisting of a plurality of substantially flat sections disposed end to end, said base having laterally projecting edge portions lying parallel to the supporting surface, a coupling member lying adjacent the ends of contiguous base sections and disposed between the base and the supporting surface, said coupling member having parallel lateral edges and an offset portion for spacing the lateral edges thereof from the supporting surface, and a cap or cover of general U or channel shape having at its edges inwardly extending projections arranged to engage back of the lateral edges of the base and coupling.

7. In an electrical conduit the combination of a substantially flat base consisting of a plurality of sections disposed end to end, a cover member of general U or channel shape having inwardly extending edge portions forming seats to receive the edges of the base, an integral coupling disposed upon contiguous base sections and also lying in the seats of said cover member, together with means for securing said coupling directly to a supporting surface whereby said base and cover member are supported by the coupling.

8. In an electrical conduit the combination of a base having laterally projecting edge portions lying parallel to the supporting surface and consisting of a plurality of sections disposed end to end, a coupling member lying upon the ends of contiguous base members and a cap or cover of general U or channel shape having inwardly extending edge portions forming seats, said seats being conformed and disposed to receive and grip the edges of both the base and coupling.

9. A conduit for electric conductors comprising a flat base, a channel cover having sharp parallel edges overlapping the lateral edges of the base, and devices for securing said conduit to a flat supporting surface, so that the sharp overlapping edges of the cover engage and extend slightly into the supporting surface throughout the length of the conduit.

10. In an electrical conduit the combination of a base consisting of a plurality of flat sections disposed end to end, each section having laterally projecting edge portions lying parallel to the supporting surface, a separate one piece coupling member lying upon the ends of contiguous base sections, and a cap or cover of general U or channel shape arranged to inclose the base and coupling member, with the legs of the cover member lying in immediate proximity to the supporting surface throughout the length of the conduit.

11. In a conduit for electric conductors the combination with a base member extending over a flat supporting surface and comprising a plurality of flat electricity conducting sections disposed end to end, a cover of general U or channel shape overlapping the lateral edges of the base member with the edges of the cover in immediate proximity to the supporting surface, and separate integral coupling members of electricity conducting material lying upon contiguous base sections, each of said coupling members lying wholly within the channel defined by said cover member and insuring the electrical continuity of the base member.

12. In a conduit for electric conductors, the combination with a base member extending over a supporting surface, said base member consisting of a plurality of substantially flat sections disposed end to end, a cap or cover member of general U or channel shape overlapping the lateral edges of the base and having seats formed at its edges into which the lateral edges of the base sections extend, a coupling member lying against contiguous base sections and having two lateral edges extending into the seats formed on the edges of the cover member, and means for securing said coupling member to a supporting surface.

13. A conduit for electric conductors comprising a base member consisting of a plurality of substantially flat sections disposed end to end and extending over a flat supporting surface, a cover member coöperating with the base member to provide a continuous passage through which electric conductors may extend, and a coupling member adjacent contiguous base sections, said coupling member having laterally projecting edge portions lying adjacent those faces of the base sections nearest the supporting surface, said coupling member also having an offset portion for spacing the lateral edges thereof from the supporting surface.

In witness whereof I hereunto subscribe my name this 13th day of August, A. D., 1915.

CHAUNCEY W. ABBOTT.

Witnesses:
W. H. STONE,
G. M. STEUART.